(12) United States Patent  
Golden

(10) Patent No.: US 8,955,462 B1  
(45) Date of Patent: Feb. 17, 2015

(54) SYSTEM AND METHOD FOR REMOTE GUIDANCE OF AN ANIMAL TO AND FROM A TARGET DESTINATION

(75) Inventor: John Michael Golden, Pell City, AL (US)

(73) Assignee: WolfGIS, LLC, Pell City, AL (US)

( * ) Notice: Subject to any disclaimer, the term of this patent is extended or adjusted under 35 U.S.C. 154(b) by 137 days.

(21) Appl. No.: 13/525,299

(22) Filed: Jun. 16, 2012

Related U.S. Application Data

(60) Provisional application No. 61/497,842, filed on Jun. 16, 2011, provisional application No. 61/551,842, filed on Oct. 26, 2011.

(51) Int. Cl.  
*A01K 15/04* (2006.01)

(52) U.S. Cl.  
USPC .......................................................... 119/721

(58) Field of Classification Search  
CPC ....................................................... A01K 15/04  
USPC ........................................... 119/712, 720, 721  
See application file for complete search history.

(56) References Cited

U.S. PATENT DOCUMENTS

2006/0027185 A1* 2/2006 Troxler .......................... 119/721  
2010/0139576 A1* 6/2010 Kim et al. ...................... 119/721

* cited by examiner

*Primary Examiner* — Monica Williams  
(74) *Attorney, Agent, or Firm* — Butler Snow LLP

(57) ABSTRACT

A system and method for remote guidance of a dog or other suitable animal to and from a selected location using GPS related triangulation methods. The system using a series of audible cues or electrical shocks to guide the dog from a current location to a target location by continually monitoring the current GPS location of the dog and establishing a waypoint target for the animal as it moves. The system issues cues such as audible signals to control the dog and keep it confined within a suitable corridor so that the next waypoint may be attained. Using the invention, a dog owner can control the movement of the dog as the owner moves in its proximity, thereby creating an invisible tether or "virtual leash" or to the animal.

16 Claims, 9 Drawing Sheets

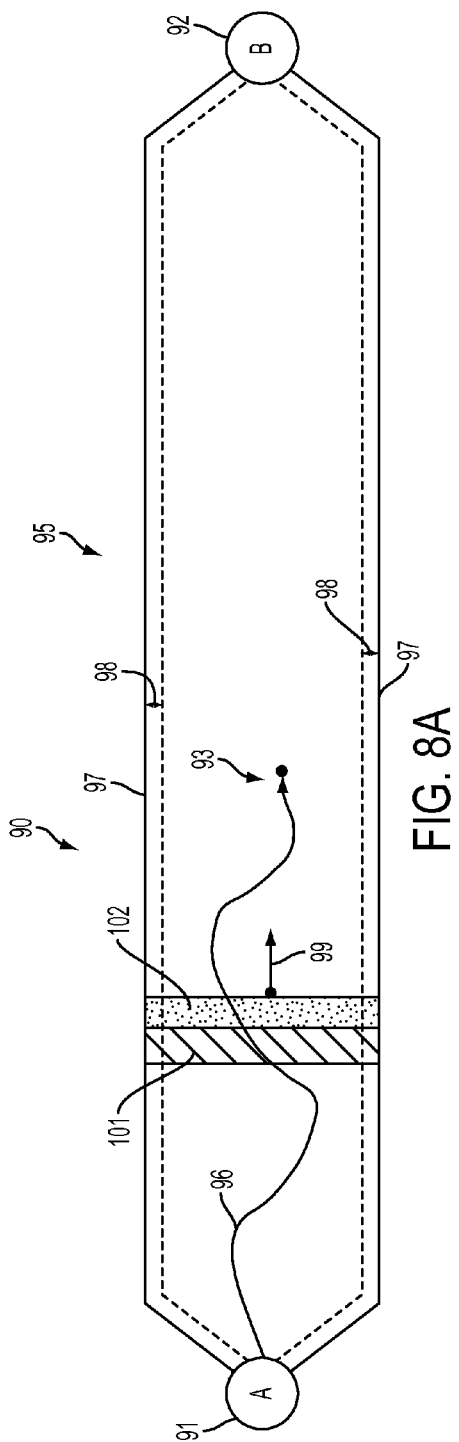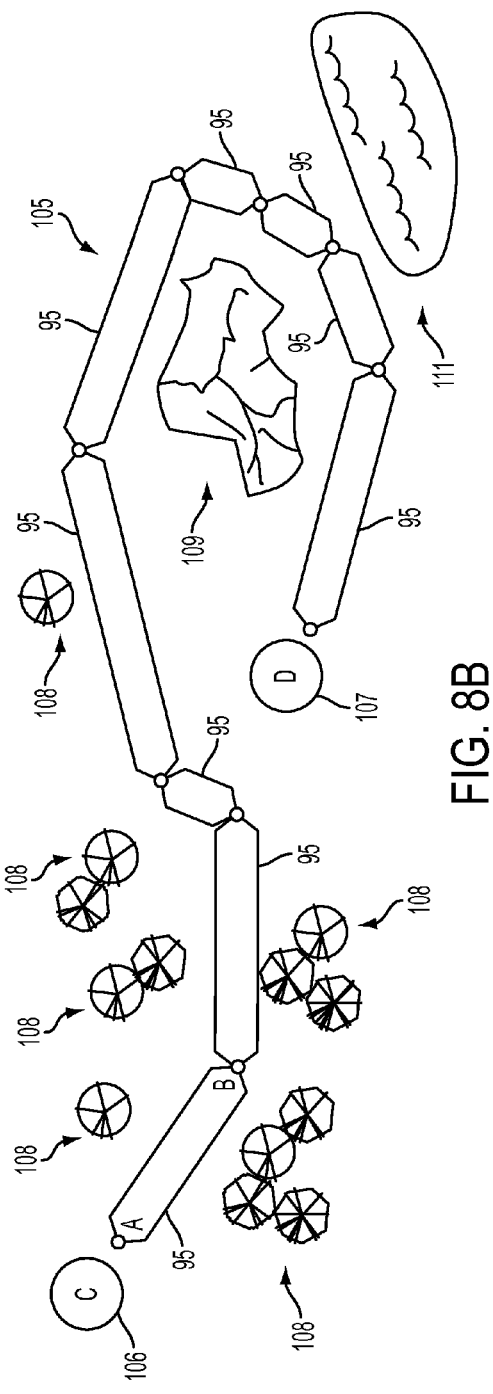

SYSTEM AND METHOD FOR REMOTE GUIDANCE OF AN ANIMAL TO AND FROM A TARGET DESTINATION

This application claims the benefit of filing priority under 35 U.S.C. §119 and 37 C.F.R. §1.78 of the U.S. Provisional Application Ser. No. 61/497,842 filed Jun. 16, 2011, for a Software Algorithm For Mobile Devices Using Position Sensor To Lock User Position Within Boundary Lines, and U.S. Provisional Application Ser. No. 61/551,842 filed Oct. 26, 2011, for a Dog Collar with Aural Cues and Tract-Lock GPS Technology. All information disclosed in those prior provisional applications is incorporated herein by reference.

FIELD OF THE INVENTION

The present invention relates generally to devices using GPS based software and hardware to determine an Earth based location. In greater particularity, the present invention relates to GPS prediction methods. In even greater particularity, the present invention relates to animal control collars to confine an animal to predefined boundary area.

BACKGROUND OF THE INVENTION

The use of global positioning systems (GPS) to determine the terrestrial position of a portable device is well-known in the art. For instance, U.S. Pat. No. 5,375,059 to Kyrtsos et al., U.S. Pat. No. 5,438,517 to Sennott et al., and U.S. Pat. No. 5,490,073 to Kyrtsos each describe a navigational system for vehicles utilizing the electromagnetic signals received from GPS satellites. The aforementioned patents (U.S. Pat. No. 5,375,059; U.S. Pat. No. 5,438,517; U.S. Pat. No. 5,490,073) are hereby incorporated by reference in their entireties.

A global positioning system works by utilizing a network of GPS satellites that continuously transmit signals to the Earth; the data transmitted by these signals includes the precise time at which the signal was transmitted by the satellite. By noting the time at which the signal is received at a GPS receiver, a propagation time delay can be calculated. By multiplying the propagation time delay by the signal's speed of propagation, the GPS receiver can calculate the distance between the satellite and the receiver. This calculated distance is called a "pseudorange," due to error introduced by the lack of synchronization between the receiver clock and GPS time, as well as atmospheric effects. Using signals from at least three satellites, at least three pseudoranges are calculated, and the position of the GPS receiver is determined through a geometrical triangulation calculation.

When GPS signals are not available, the position of a portable device may also be calculated through other means, such as a dead-reckoning system incorporating an accelerometer. For instance, U.S. Pat. No. 5,606,506 to Kyrtsos and U.S. Pat. No. 6,308,134 to Croyle et al. each describe navigational systems integrating both GPS and dead-reckoning techniques. U.S. Patent Publication No. 2007/0260398 to Stelpstra further describes a device that calculates calibration parameters for its accelerometer while GPS data is available, enabling the device to determine its position exclusively using data derived from the accelerometer when GPS data is unavailable. The aforementioned patents and patent publications (U.S. Pat. No. 5,606,506; U.S. Pat. No. 6,308,134; U.S. Patent Publication No. 2007/0260398) are hereby incorporated by reference in their entireties.

Certain currently available GPS systems also utilize remote databases to store GPS related information, which is then communicated to a portable device. U.S. Pat. No. 6,222,483 to Twitchell et al., for example, discloses a GPS location system for mobile phones in which the GPS satellite information is stored in a database on a server accessed via an Internet interface. The aforementioned patent (U.S. Pat. No. 6,222,483) is hereby incorporated by reference in its entirety.

Animal training systems that utilize geo-positioning techniques to control movement of an animal via electrical and audible cues are also known in the art. For example, U.S. Pat. Nos. 7,034,695 and 7,786,876 to Troxler and U.S. Pat. No. 5,857,433 to Files each disclose a device for controlling an animal's movement using a collar to provide a physical stimulus and/or audible cue. The aforementioned patents (U.S. Pat. No. 5,857,433; U.S. Pat. No. 7,034,695; U.S. Pat. No. 7,786,876) are hereby incorporated by reference in their entireties.

However, while the tracking of animals and especially pets is already known, especially with GPS based technology, no systems meld a moving dynamic relationship between an owner's position and their pet's position, nor offer dynamic control of a pet to effect the pet's movement from one location to another. Hence, what is needed is a convenient method for dynamic boundary movement to effect movement of a pet from one location to another, and using this same methodology to control local movements of the pet in concert with its owner's movements.

SUMMARY OF THE INVENTION

In summary, the invention is a system and method for remote guidance of a dog or other suitable animal to and from a target location using current geo-location methods. The system using a series of audible cues or electrical shocks to guide the dog from its present location to a target location by continually monitoring the current GPS location of the dog and establishing a waypoint target for the animal as it moves. The system issues cues such as audible signals to control the dog and keep it confined within a suitable corridor so that the next waypoint may be attained. Other features and objects and advantages of the present invention will become apparent from a reading of the following description as well as a study of the appended drawings.

BRIEF DESCRIPTION OF THE DRAWINGS

A system and method for remote guidance of a dog to and from target locations incorporating the features of the invention is depicted in the attached drawings which form a portion of the disclosure and wherein:

FIG. 8A is a diagram showing an example guided movement through a distance segment;

FIG. 8B is a diagram showing example movement using a plurality of movement segments shown in FIG. 8A to form a guided trek for a dog;

DESCRIPTION OF THE PREFERRED EMBODIMENTS

Figure 1:
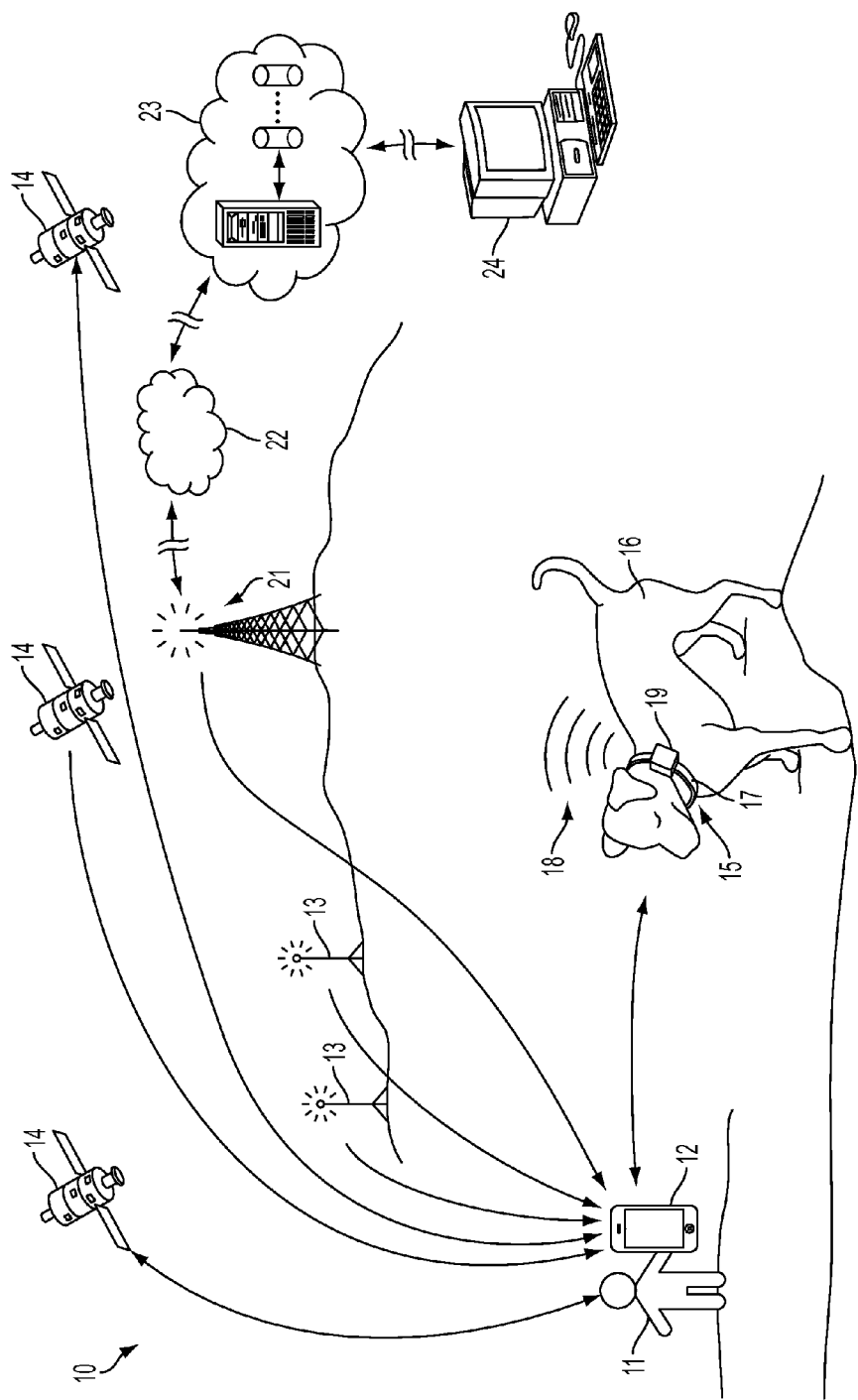
FIG. 1 is a general communication system infrastructure diagram showing a dog wearing the invention and connected to various communication elements in which the collar operates.

Referring to the drawings for a better understanding of the function and structure of the invention, FIG. 1 shows a schematic view of the communications infrastructure 10 utilized by the present invention during typical use. In this sample scenario, an individual 11 desires to guide the movement of a dog 16. The user initiates a software application on mobile device 12, which includes receivers capable of detecting signals originating from GPS satellites 14, WiFi repeater/booster stations 13, and one or more cell towers 21, as well as signal 18 originating from the electronics module 19 located on the dog's collar 15.

By connecting with the Internet 22 via WiFi, Bluetooth, or cell transmissions, the software application can access both land tract data and the dog's geo-positional data stored in a SQL relational database on a remote server, such as cloud server 23. The data contained on cloud server 23 can also be accessed and modified by remote computing device 24, such as a PC, via an Internet connection.

Figure 2A:
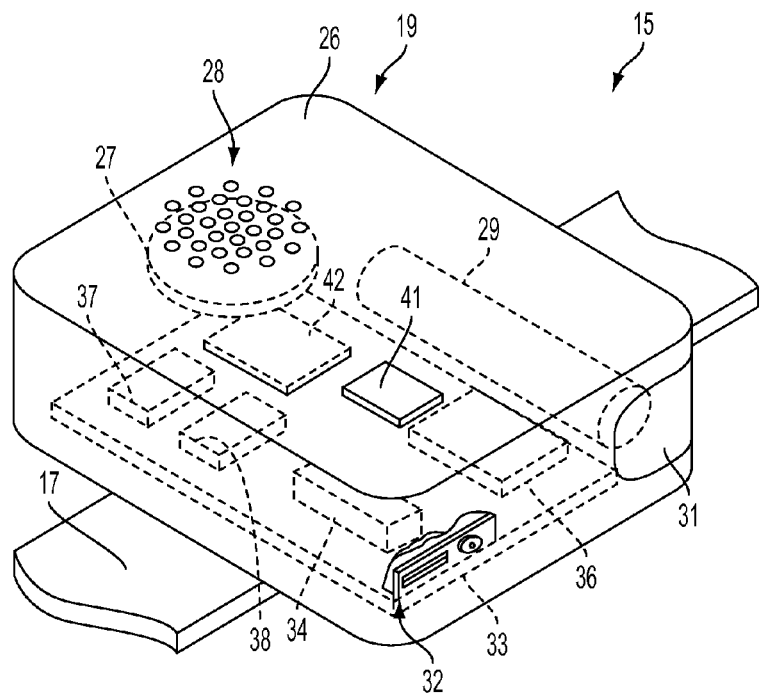
FIG. 2A is a three dimensional view of the invention showing its internal electronics.

FIG. 2A depicts a three-dimensional view of the dog's collar 15. The dog's collar 15 consists of two major components: an electronics module 19 and a self-adjusting strap 17. The electronic components are housed in a generally waterproof case 26. The electronics module 19 is powered by battery 29, which is accessible via battery compartment access panel 31. Electronics module 19 receives power and data via connection ports 32, which include a USB connector and a power connector. Dual-sided motherboard 33 serves as the infrastructure for the electronic components contained in the module, including input/output electronics 34, WiFi chip 36, sound synthesizer 37, GPS chip 38, cellular transceiver 41, and microprocessor 42. Electronics module 19 also contains acoustic device 27, which is located directly beneath case perforations 28 in order to produce optimal sound quality. Additional embodiments of invention include electronic components used for monitoring and recording physiological data, such as the dog's pulse rate or body temperature.

Figure 2B:
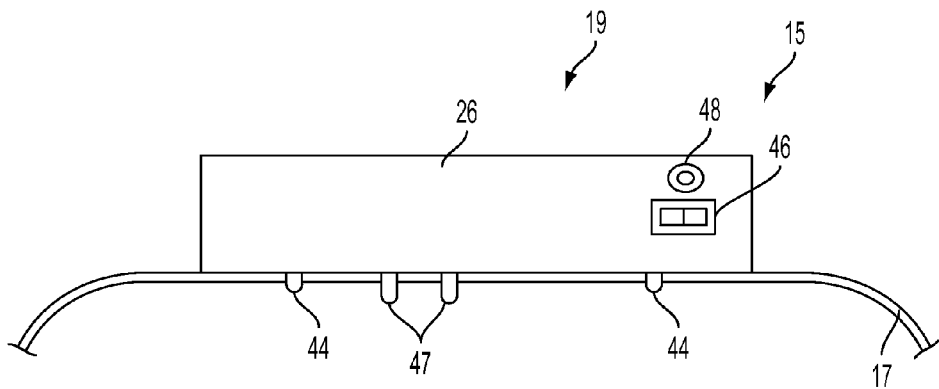
FIG. 2B is a side view of the invention showing its shocking prongs and an external switch.

FIG. 2B depicts a side view of the dog's collar 15. The on/off switch 46 is located on the side of the electronics module 19, directly adjacent to an LED 48 that indicates whether the collar's electronic components are on or off. Self-adjusting collar strap 17 attaches to the electronics module 19 via strap retainers 44. Shocking prongs 47 protrude through holes in strap 17 in order to maintain contact with the dog's body.

Figure 3:
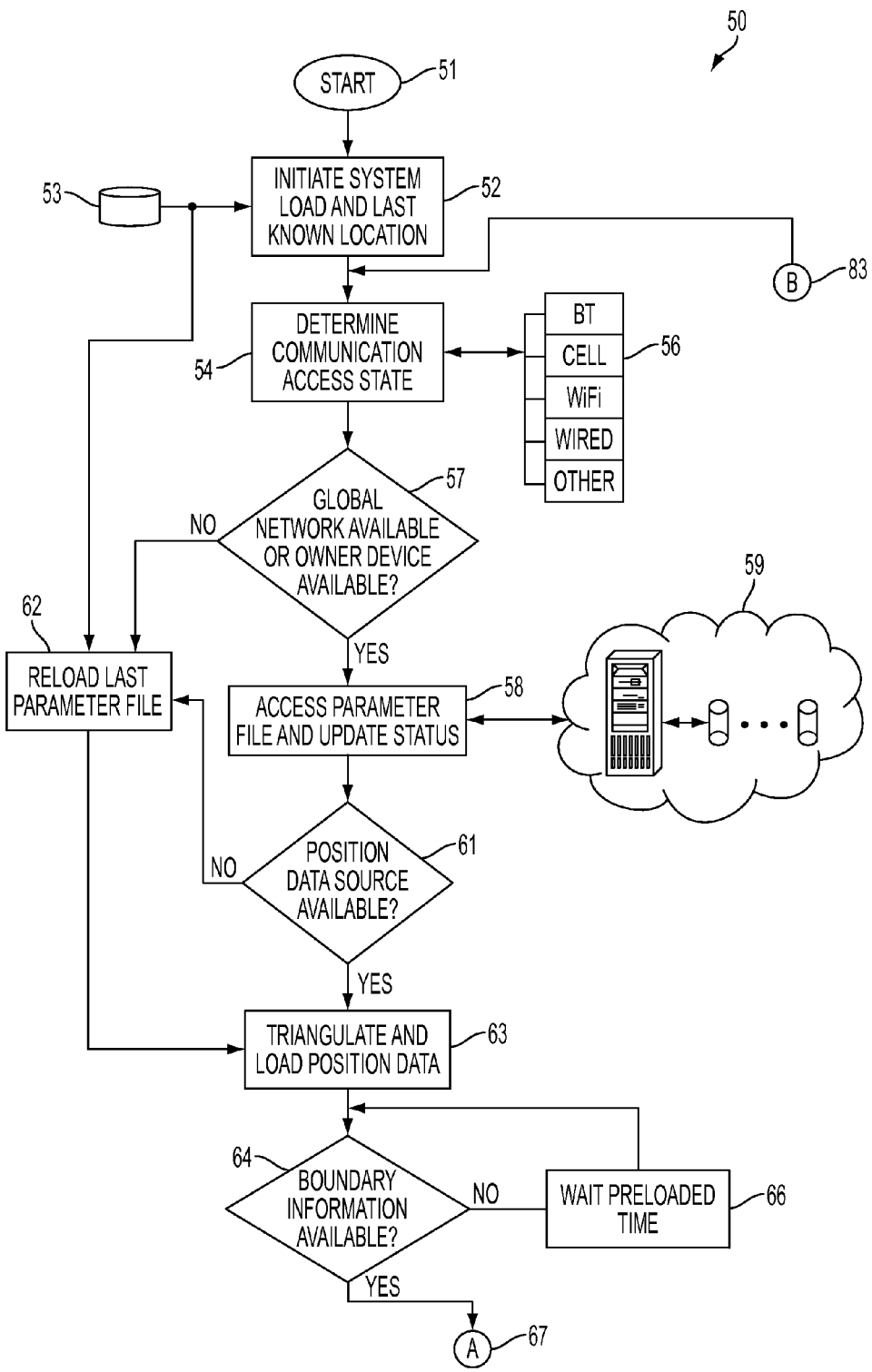
FIG. 3 is a process flow diagram showing part of the processing of the invention.

FIG. 3 illustrates the process 50 by which the software algorithm of the present invention determines a dog's terrestrial position. As discussed previously, a user who wishes to determine his or her dog's position will initiate the software application on mobile device 12. The user will also ensure that the dog collar 15 is switched on, thereby initiating the software in collar 15 as well. Upon initiation 52, the dog collar 15 will retrieve and load last-known position data from the local storage 53 in the dog collar 15. After loading the last-known position data, the software algorithm determines 54 the most appropriate communication access state, choosing among the available communication paths 56, which, depending on signal strength and availability, could include communication via Bluetooth, cell, WiFi, wired, or other such methods. The software algorithm ranks the various communication paths 56 in real time, basing its ranking on signal strength, transmission speed, and other such factors that affect the efficiency of data transmission. Once the optimal communication path 56 is chosen, the software algorithm determines 57 whether the chosen communication path 56 will allow it to access the Internet or a device associated with the dog's owner, such as mobile device 12 or PC 24. If the software is unable to access the Internet or a device with the chosen communication path 56 (e.g., if the signal were too weak to provide an adequate connection), FIG. 3 illustrates a method by which the software uses the last-known position data previously retrieved from local storage 53 to calculate 63 the dog's current position, a process which is detailed below. In other embodiments of the invention, however, position data produced by dead-reckoning techniques, such as an accelerometer-based method, may be used in place of the last-known position data.

If the chosen communication path 56 will allow the software to access the Internet or a device, it will access 58 the owner's account on cloud server 59 or local storage on the owner's device. The software will communicate with the server or device to record data indicating the dog's current geo-positional location and/or update the status of the dog's position with respect to a boundary. The software will also access any designated boundary data, if available.

Once the software application has communicated with cloud server 59 or a device, the software determines 61 whether a position data source is available. Again, FIG. 3 illustrates a process in which GPS positioning is the method used to calculate the dog's current location, but other embodiments of the present invention would utilize various methods of location determination, including a system integrating GPS positioning with accelerometer-based dead-reckoning.

In order to determine whether a position data source is available, the software communicates with a GPS receiver located in electronics module 19. If at least three GPS signals are available, the software uses the time stamp obtained from each signal to calculate a pseudorange for each satellite. Once the pseudoranges have been calculated, the algorithm geometrically triangulates 63 the terrestrial position of collar 15 and records the resulting position data as the dog's current location.

In the preferred embodiment of the invention, accuracy of geo-position data is increased by utilizing multiple position calculations, including triangulation based on signals from GPS satellites, cell towers, and WiFi transceivers, as well as data obtained from an accelerometer-based dead-reckoning system. Additionally, a differential "receiver autonomous integrity monitoring" ("RAIM") method may be applied to data received from the GPS, cell tower, or WiFi transceiver signals. The RAIM method utilizes data obtained from redundant sources (i.e., signal sources above the minimum number required for triangulation) to estimate the statistical probability of inaccuracy in a device's calculated geo-position. Further, the preferred embodiment of the invention utilizes a NIST-calibrated time stamp to calculate and compensate for geo-positioning error resulting from inaccuracies in the time stamps contained in GPS, WiFi, and cell signals used for triangulation, as well as inaccuracies in the internal clock of components of mobile device 12 and electronics module 19. The preferred embodiment of the invention utilizes NIST-calibrated time data obtained from a remote server. One example of a provider of time data with a NIST Certificate of Calibration is Certichron, Inc. A further embodiment of the invention would utilize a nearby base station with a known location. Geo-positioning data for the local base station would be obtained via GPS, WiFi, and cell signal triangulation methods and utilized to further calculate and compensate for inaccuracies associated with the geo-position data obtained by mobile device 12 and electronics module 19. Through one or a collection of the above strategies, accurate geographical location to within a few inches for a device may be routinely obtained.

Once the software has obtained position data via any of the above-discussed methods, the software will then determine 64 whether data associated with a designated boundary is available. If not, the software will wait a preloaded time 66 and then proceed again to determine 64 whether boundary data has become available. The algorithm will continue this process until the software is able to access boundary information for the session.

Figure 4:
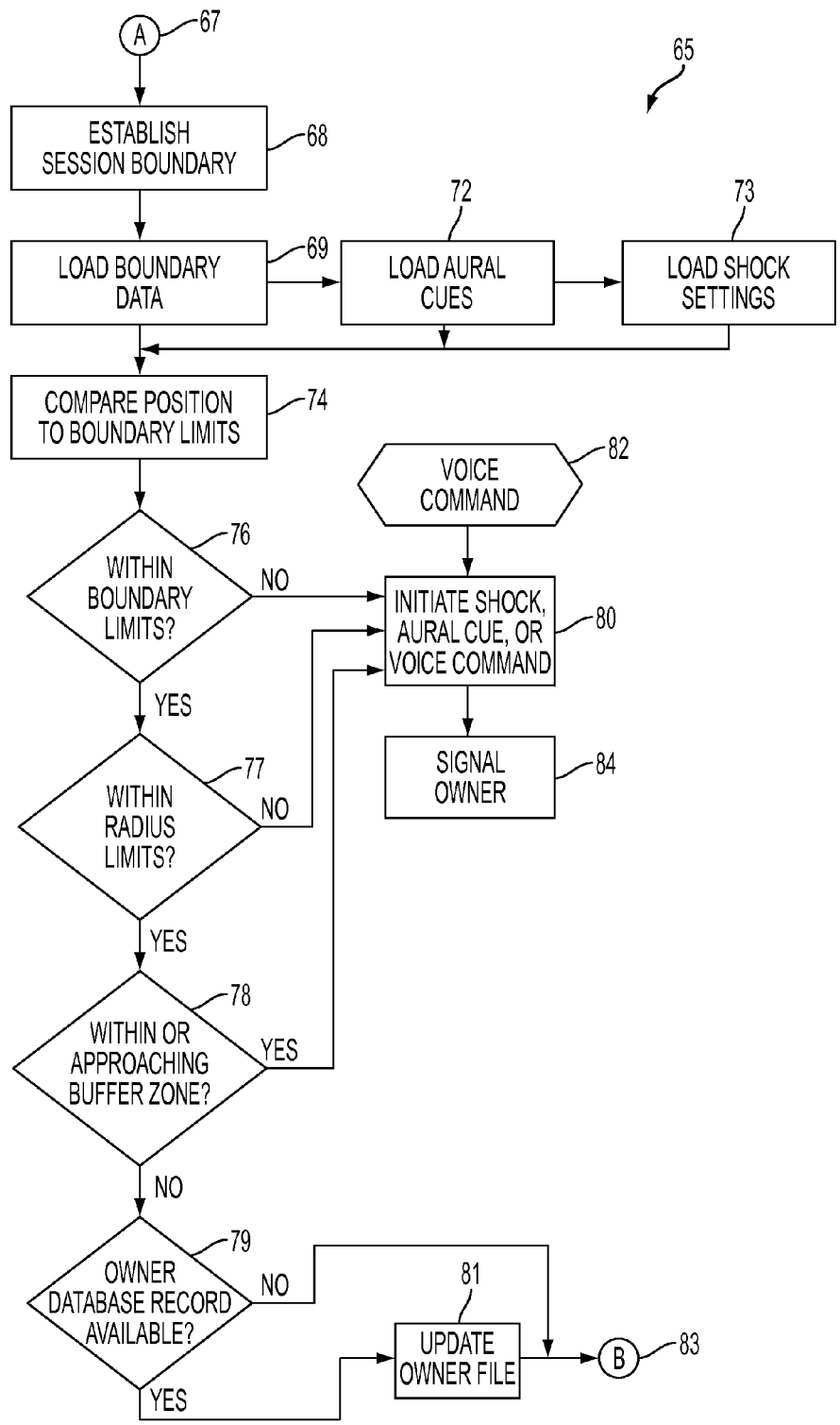
FIG. 4 is a process flow diagram showing another portion of the processing of invention with stimulus control of the dog.

Referring now to FIG. 4, the software proceeds to establish 68 a geographic boundary for the session. In one method, a data file with coordinates for a pre-specified path boundary could be downloaded to the collar. In another embodiment, the user could specify that a pre-defined boundary relating to a particular tract of land (e.g., a path defined by an easement that traverses a property) be established as the boundary for the session. In an additional embodiment, a boundary data set could be created by the user by pinpointing vertices of a polygon or polygons on a map of a tract of land on a remote computing device and uploading the data set directly to the collar or via database 59. In another method, a user could pinpoint a single point (stationary or dynamic) and define the boundary as a circle of a specified radius with a center at the chosen point. In an additional embodiment, a user could travel the desired path boundary holding either mobile device 12 or collar 15, thereby creating a boundary data set consisting of the coordinates of selected points on the desired path boundary.

In a preferred embodiment of the invention, a user could "draw" the boundary of a desired path directly onto a map of a tract of land in a software application coupled electronically with device 12 or database 23. In this embodiment, mobile device 12 would include a touch-sensitive screen apparatus; when the user touches a point on the map of the tract shown on the device's screen, the application would record that point's geo-position coordinates. As the user touches successive points on the screen, the application would record a series of coordinates. Once the user defined the desired path boundary on the map of the tract, the data set consisting of the series of coordinates would be used to establish that session's boundary. Further, in the preferred embodiment of the invention, each boundary defined by a user is stored in a SQL relational database, allowing the user to utilize the same boundary data set in later sessions.

Referring again to FIG. 4, a geographic boundary is established 68 for the session, and the software loads 69 the boundary data and displays the boundary on the user's device screen. Along with the boundary data, the software also loads aural cues 72 and shock settings 73 that have been stored either locally, on a connected device, or on cloud server 59. The algorithm then compares 74 the dog's current position with the boundary previously established for the session. If the software determines 76 that the dog's current position is not within the specified boundary limits, the software will initiate 80 a shock, aural cue, and/or voice command, which the dog's owner would have previously recorded to a data file and stored 82 in the database on cloud server 59. In lieu of an administered shock, the collar might also be equipped with a canine offensive mist that can be dispensed upon command. In addition to these immediate corrective actions, the software would also signal 84 the dog's owner to notify him of the dog's current position with respect to the boundary.

In an embodiment of the invention in which the owner chooses to create a boundary by pinpointing the center of a circle with a specified radius, after the software algorithm compares 74 the dog's current position with the boundary 102 established for the session. If the software determines 77 that the dog's current position is not within the specified radius limits established as the boundary for the session, the software will initiate 80 a shock, aural cue, and/or voice command and signal 84 the owner to notify him of the dog's current position with respect to the boundary.

If the software determines that the dog's current position is within the specified boundary for the session, the algorithm then determines 78 the dog's position with respect to a buffer zone. Generally, the buffer zone will be defined by the owner as a set distance from any point on the boundary line (e.g., the user would like to receive a warning if the dog travels within 2 feet of any point on the boundary line). In another embodiment of the invention, the owner could define a more specialized buffer zone (e.g., the owner would like to receive a warning if the dog travels within 1 foot of the path boundary adjacent to a particular tract of land, but would only like to receive a warning if the dog travels within 2 feet of a path boundary adjacent to a separate tract of land). In either case, the buffer zone may be defined either by the owner in the software application, or by a remote user connected to a remote computing device with access to the server storing the SQL relational database.

If the application determines 78 that the dog's current position 98 is within the designated buffer zone, the software will initiate 80 an aural cue and/or voice command and signal 84 the owner.

Even if the dog's current location is not within the buffer zone, the application also uses predictive modeling to determine whether the dog is approaching the buffer zone, based on the velocity vectors obtained from GPS/WiFi/cell tower triangulation data or data obtained from the collar's accelerometer or other dead-reckoning system. If the velocity vector data indicates that the dog will enter the buffer zone within a time period that has been pre-specified by the owner or a remote administrator (e.g., if the dog will enter the buffer zone within 2 seconds), the application will initiate 80 an aural cue and/or voice command and signal 84 the owner.

After performing the steps discussed above, the application then determines 79 whether the owner's database record is available. If so, the application updates the position data contained in either local storage on mobile device 12 or PC 24, or the SQL relational database stored on cloud server 23, updating 81 the owner's data file by recording the dog's current location with respect to time, as well as a velocity vector to indicate the dog's heading.

Figure 5:
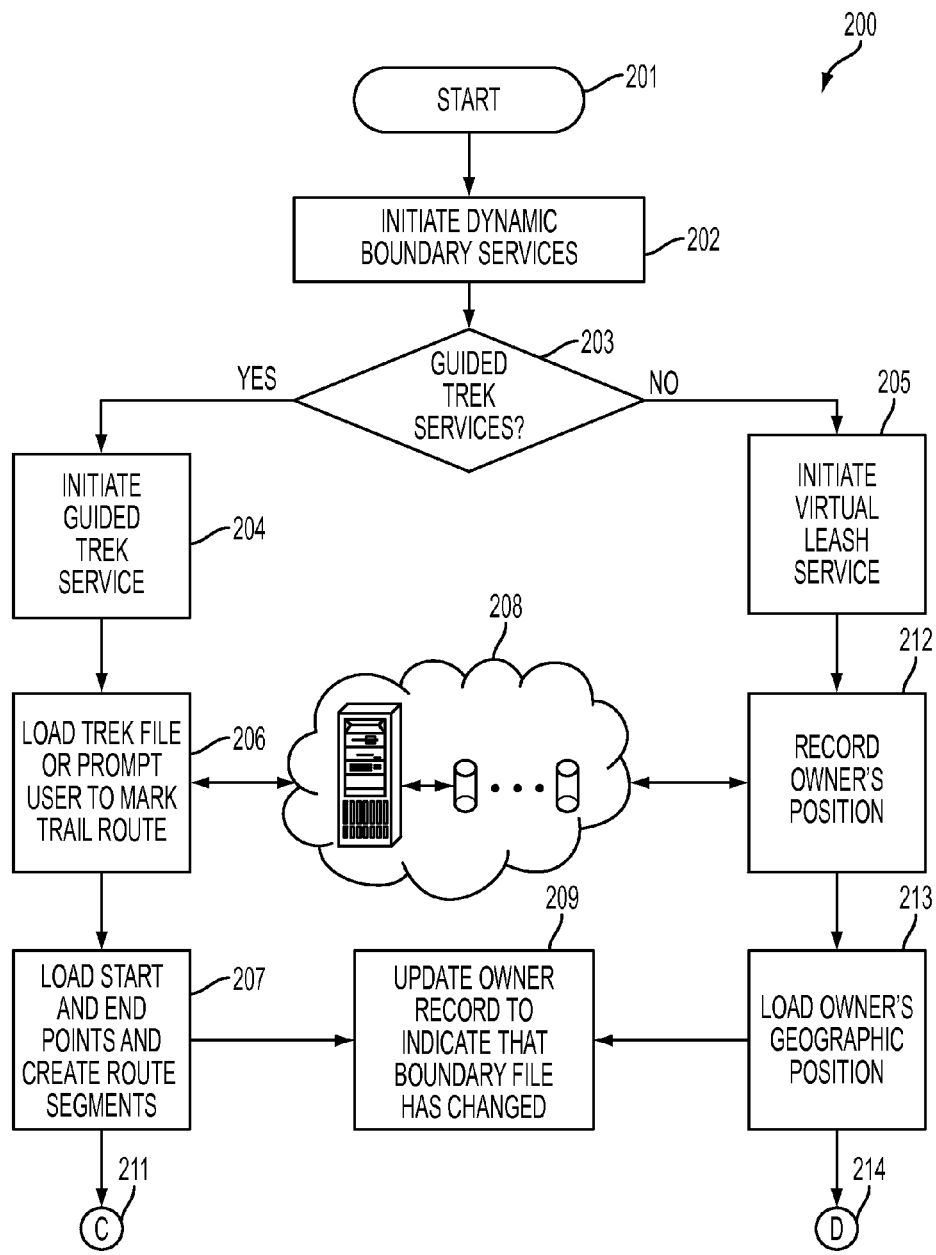
FIG. 5 is a process flow diagram showing dynamic boundary services.
Figure 9A:
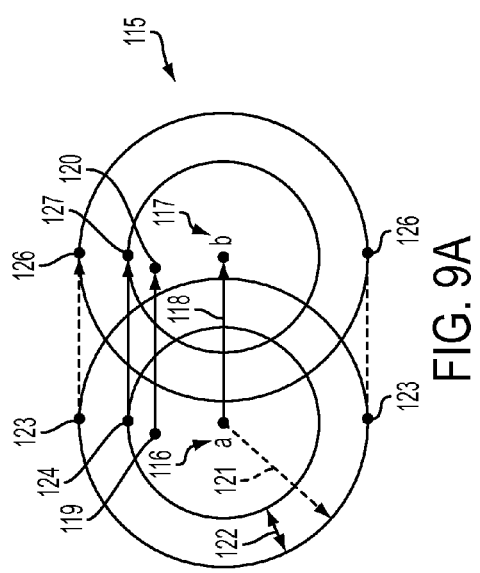
FIG. 9A is a diagram showing an example guided movement using a virtual leash from one point to another; and, FIG. 9B is a diagram showing an example movement using a plurality of guided movements using a virtual leash shown in FIG. 7A to form an owner and dog guided trek.
Figure 9B:
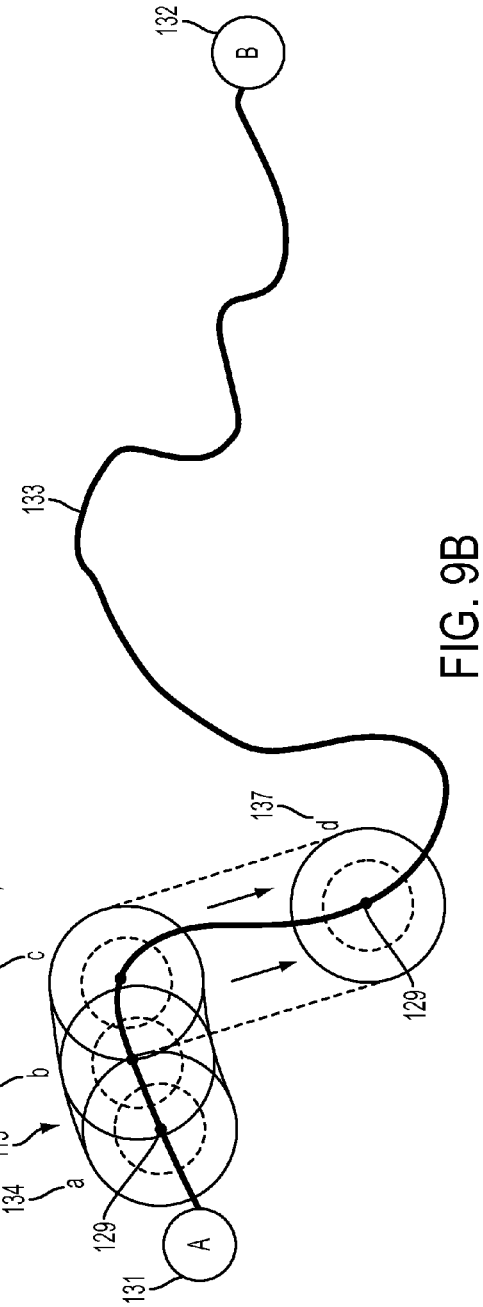

FIG. 5 depicts the process 200 through which the software algorithm of the present invention provides dynamic boundary services. A user who desires a dog's movement to be confined within a dynamic, as opposed to stationary, boundary would initiate 202 the dynamic boundary services algorithm via the application interface. The application can provide two types of dynamic boundary services: a "guided trek" boundary service, and a "virtual leash" boundary service. A guided trek boundary is depicted in FIGS. 8A and 8B; a virtual leash boundary is depicted in FIGS. 9A and 9B.

Figure 7:
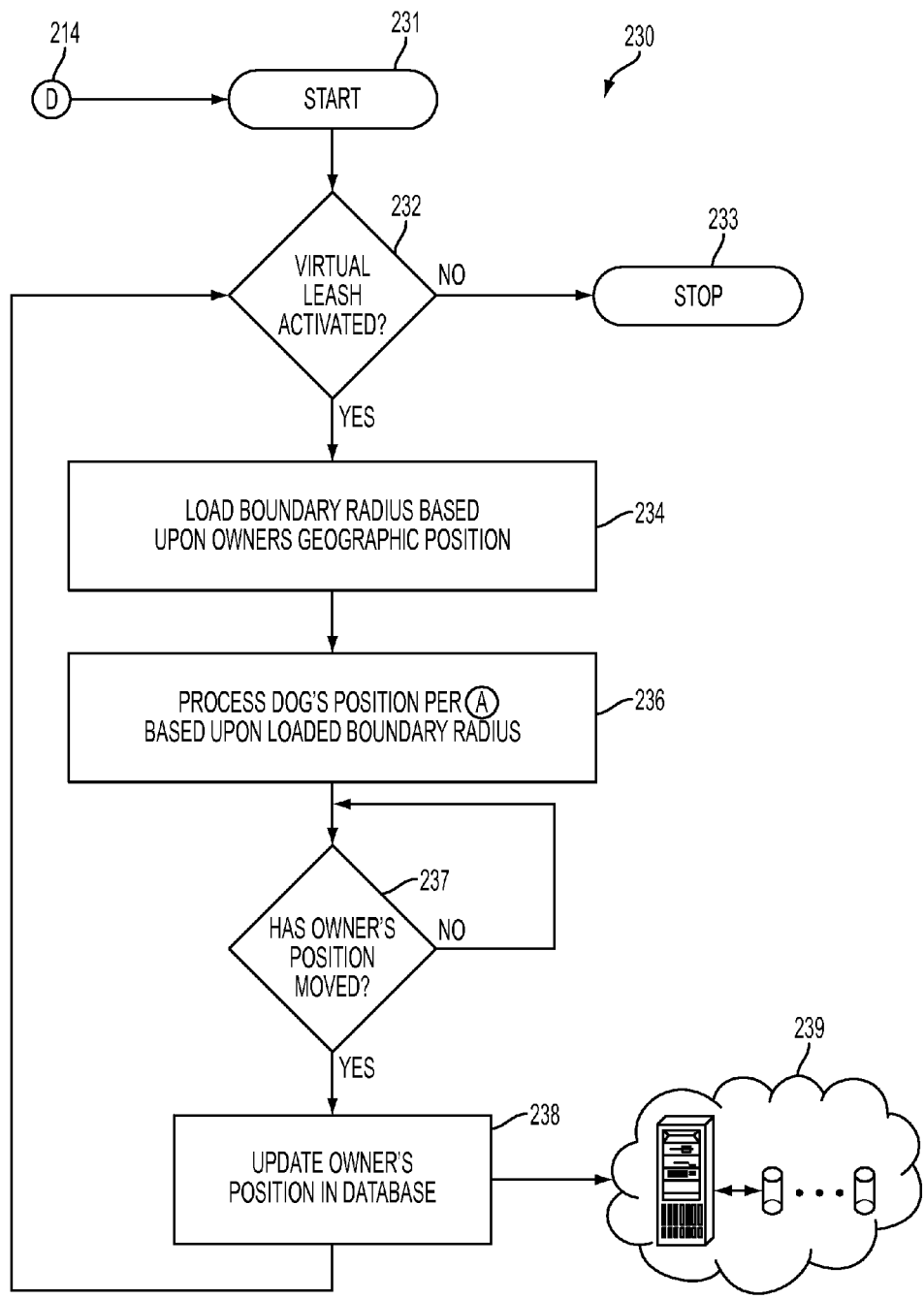
FIG. 7 is a process flow diagram showing virtual leash application of the invention.

Once an owner has initiated 202 the dynamic boundary services algorithm, the owner will choose 203 whether he or she would like to have the application guide the dog along a predefined path (a "guided trek"). If the owner would prefer to guide the dog in relation to real-time movements by the owner, then the application initiates 205 the "virtual leash" service, which allows the owner to tether the dog within a specified radius of the owner's position. Once the virtual leash service has been initiated 205, the software records 212 the owner's position and stores the position data in a SQL relational database on cloud server 208. The application then loads 213 the owner's geographic position data, updates 209 the owner record to indicate that the boundary file has changed, and proceeds with "virtual leash" process 230, as depicted in FIG. 7.

If the owner chooses 203 to have the application guide the dog along a predefined path, the software will initiate 204 the "guided trek" service. The application will then prompt the owner to either mark a trail route or load a previously marked route or trek file retrieved from cloud server 208. If the owner chooses to mark a trail route, the trail route coordinates will be recorded and stored to the SQL database on cloud server 208 to create a "dynamic boundary file." A dynamic boundary file is essentially a file that includes all of the necessary information for collar 15 to dynamically control dog 16 utilizing processes 65, 220, and 230. As may be understood, this file may be saved and re-used again and again as desired by the owner 11 because it is retained in database 23 and associated with the owner's profile there. Once the coordinates along the specified route have been obtained, the application will create 207 route segments and load start and end points for the same. The application then updates 209 the owner record to indicate that the boundary file has changed, and proceeds with "guided trek" process 220, as depicted in FIG. 6.

Figure 6:
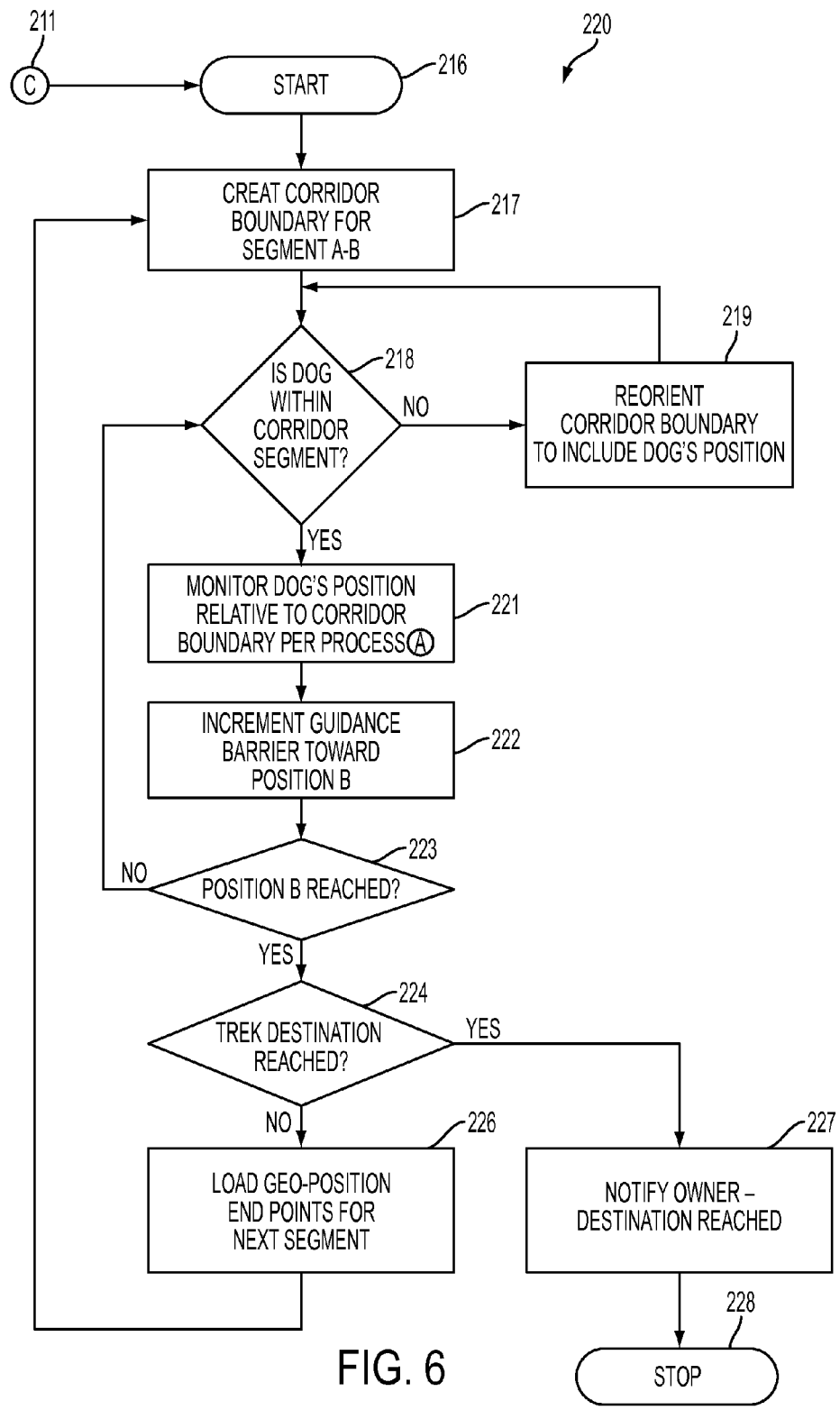
FIG. 6 is a process flow diagram showing guided trekking of a dog.

Referring now to FIGS. 6 and 8A-8B, in unison, it may be seen that process 220 running on device 15 controls dog 16 to move it from a starting location to an ending location, thereby providing a remote guidance mechanism for animal 16 to embark on the controlled trek. FIGS. 8A-8B show the physical implementation of the process 220 in an actual trek example 105.

After determination that a guided trek has been selected through process 200 and the starting and ending points of the trek have been established by the dynamic boundary file 207, device 15 creates a plurality of corridor boundaries 90 based upon the information in the dynamic boundary file. A series of individual segments 95 connected at their end points is created to form a guided trek 105. Each segment 95 includes a start point A 91 and an end point B 92, connected together by parallel boundaries 97 and corridor wall buffers 98. The corridor has a width spanned by movable control boundary 101 which is anticipated by a movable buffer zone 102 as the control boundary 101 moves along in a forward direction 99.

After creation of the first corridor 217, the device 15 determines whether the dog or animal is within the corridor 218 and re-orients the corridor location to include the dog's location if it is found to be outside of the corridor 90. Various logic decisions are also made at this time to ascertain if the trek goals are impossible given the dog's current location so that feedback to the owner may be provided in impractical situations. Once the dog has been oriented in a corridor 90 the dog's position is monitored relative to boundary rules and actions established in process A 65.

To cause movement in dog 16, left most boundary adjacent to start point A 91 is effectively moved toward end point B by advancing 222 control boundary 101 from point A 91 in a forward direction 99 until point B 92 is reached 223. As may be understood from FIG. 4, as dog 16 encounters buffer zone 102 certain motivating cues and shocks are applied to it, in escalating intensity, causing the dog to move its position 93 forward well ahead of control boundary 101, thereby resulting in a generally forward travel path 96 along the corridor 90.

When position B 92 is reached 223, the process 220 determines whether the trek end destination has been reached 224. If it has not been reached, the next set of end points A-B are loaded 226 and a new corridor is created 217, effectively creating a series of waypoints for the dog to follow. This process is repeated until the trek destination is reached at which time the owner is notified 227, ending process 220.

As can be better seen in FIG. 8B, a dynamic boundary file can be created to guide dog 16 through a series of corridors 90 and around dangerous or undesirable travel areas. For example, owner 11 may position trek segments 95 and starting and ending points A-B to avoid dense tree foliage 108, rocky outcroppings 109, and water hazards 111, so that trek 105 may be safely traveled by a dog.

It will be apparent that treks through difficult terrain or through hazardous environments may require substantial variance in segment length, bearing, and location. Hence, while one type of guided trek 105 may only require a few segments of relatively lengthy distance, other treks may require dozens of segments with shorter lengths and multiple bearings corresponding to the entire compass range. This enables the owner to flexibly design a dynamic boundary strategy that will accommodate varying environmental situations through which a dog may traverse.

Referring now to FIGS. 7 and 9A-9B, in unison, it may be seen that as an alternative to a remote, moving boundary corridor, an owner 11 may decide to proximally lead dog 16 as they themselves move from point A 131 to point B 132. Process 230 running on device 15 achieves this by creating a "virtual leash" between the owner 11 and dog 16 as they move along a travel path 133.

Initially, the process 230 is loaded 231 in collar 15 and activated 232. The location of the owner 11 is then transmitted to database 23 (see step 208 of FIG. 5) from device 12 worn or held by the owner 11. That geographic position is transmitted from database 23 to collar 15 via a dynamic boundary file through whatever wireless access is available to collar 15, and a boundary radius is created 234 in accordance with additional parameters present in the dynamic boundary file or as determined by pre-programmed collar parameters. The dog's position is then processed pursuant to method A 236 to keep the dog within the circular boundary until the owner moves their position. If the owner moves 237, the owner's position is updated 238 in remote database 239 and a new boundary radius 234 is created as long as the virtual leash process 230 is active. Process A 236 is repeated continually to keep the dog within the new radial boundary.

Referring more closely to FIGS. 9A and 9B, it may be seen that a moving series of circular boundary zones 115 are created as owner 11 moves along a desired path 133. Each radial boundary is translated from a radial position a to a new radial position b. For example, when owner 11 has a position a 116, he is surrounded by radial boundary 121 and buffer zone boundary 122. Dog 16 has a location within that boundary of 119. As owner 11 moves from position a 116 to position b 117, boundary 121 and buffer 122 are translated or repositioned along travel path 118 in a travel direction from point a 116 towards point b 117. As shown, corresponding buffer and boundary positions 124 and 123 are repositioned to points 127 and 126, respectively, during such repositioning. Since boundary compliance sessions 65 (A) (see FIG. 4) continue to be processed as owner 11 moves from position a to b, dog 16 is confined within each repositioned radial boundary as it moves, thereby causing a reposition of the dog from point 119 to point 120, and continually causing the dog to be positioned within a proximal radial distance from owner 11 as the owner moves.

FIG. 9B shows that such serial movements processed in accordance with process 230, cause a series of overlapping radial boundaries 130, such as a 134, b 135, and c 136, and eventually to boundary location d 137. As is apparent, owner's location 129 corresponds to the center point of each radial boundary moving along travel path 133 from starting location A 131 to destination point B 132. The resultant system causes the dog to keep a proximal position to owner 11 as they travel, but without the potential entanglements and inconveniences that an owner encounters in a traditional leashed travel arrangement.

While I have shown my invention in one form, it will be obvious to those skilled in the art that it is not so limited but is susceptible of various changes and modifications without departing from the spirit thereof. For example, while boundary corridors (i.e. a rectangle) and circular boundaries have been depicted, the inventor clearly anticipates various boundary shapes and sizes may be utilized to improve upon the above presented movement dynamics while still utilizing the above described methods.

Having set forth the nature of the invention, what is claimed is:

1. In conjunction with an electronic collar having an electronics module and including means for communicating wirelessly through the internet to a remote internet protocol address, means for determining a latitude and longitude for said module on the Earth, a battery, a speaker, means for communicating over a cellular network, means for controlling the internal electronics of said module, and means positioned adjacent to said module for attaching said module to an animal, a method of remotely controlling the movements of said animal wearing said electronic collar by an owner comprising the steps of:
   a. said electronic collar determining its latitude and longitude on the Earth;
   b. said electronic module receiving a dynamic boundary file and establishing a control boundary for said animal, said file including geographic boundary information capable of being dynamically altered from one location to another, wherein said step of establishing a control boundary for said animal comprises the steps of loading starting and ending destination points held by said dynamic boundary file and responsive to said boundary file, calculating a plurality of line segments each having end points of A and B, where point A is a starting point and point B is an ending point of each segment, serially connecting said segments such that movement from point A to B through said each segment forms a trek corresponding to said starting and ending destination points, and creating a corridor boundary within each said segment such that a continuous boundary corridor is created from said starting and ending destination points; and
   c. said electronic module continuously monitoring its position with respect to said dynamic boundary and issuing motivating actions to restrict movement of said animal to within the then current boundary limits, wherein said step of issuing motivating actions comprises issuing at least one aural cue and at least one shock to said animal.

2. The method as recited in claim 1, further including the step of creating a moving boundary wall spanning the walls of said boundary corridor, and wherein said boundary wall moves from point A to point B in each segment at a predetermined speed such that movement of said boundary wall causes movement of said animal from point A to point B in each segment in succession, thereby causing said animal to move from said start point to said end point.

3. The method as recited in claim 2, further including the step of said owner tracing out geo-positional coordinates on a map on an electronic device and causing said coordinates to be saved in a remote database, and wherein said geo-positional coordinates comprise the geographic basis for said dynamic boundary file.

4. The method as recited in claim 3, further including the step of monitoring the geographic position of said animal within each segment and sending said geographic position to said database continually.

5. In conjunction with an electronic collar having an electronics module and including means for communicating wirelessly through the internet to a remote internet protocol address, means for determining a latitude and longitude for said module on the Earth, a battery, a speaker, means for communicating over a cellular network, means for controlling the internal electronics of said module, and means positioned adjacent to said module for attaching said module to an animal, a method of remotely controlling the movements of said animal wearing said electronic collar by an owner comprising the steps of:
   a. said electronic collar determining its latitude and longitude on the Earth;
   b. said electronic module creating a dynamic boundary, wherein said electronic module continually updates said dynamic boundary such that the boundary moves from one location to another, wherein said step of establishing a control boundary for said animal comprises the steps of loading starting and ending destination points held by said dynamic boundary file and responsive to said boundary file, calculating a plurality of line segments each having end points of A and B, where point A is a starting point and point B is an ending point of each segment, serially connecting said segments such that movement from point A to B through said each segment forms a trek corresponding to said starting and ending destination points, and creating a corridor boundary within each said segment such that a continuous boundary corridor is created from said starting and ending destination points; and
   c. said electronic module continuously monitoring its position with respect to said dynamic boundary and issuing motivating actions to said animal such that its movements are restricted to be within the then current boundary limits.

6. The method as recited in claim 5, further including the step of creating a moving boundary wall spanning the walls of said boundary corridor, and wherein said boundary wall moves from point A to point B in each segment at a predetermined speed such that movement of said boundary wall causes movement of said animal from point A to point B in each segment in succession, thereby causing said animal to move from said start point to said end point.

7. The method as recited in claim 6, further including the step of monitoring the geographic position of said animal within each segment and sending said geographic position to said database continually.

8. The method as recited in claim 7, wherein said step of establishing a control boundary further includes the step of updating a remote database with geo-positional information and wherein said step of said electronic module receiving a dynamic boundary file comprises receiving said updated geo-positional information from said remote database.

9. In conjunction with an electronic collar having an electronics module and including a WiFi chip, a GPS chip, a battery, a speaker, a cellular transceiver, a microprocessor, and a strap, a method of remotely controlling the movements of an animal wearing said electronic collar by an owner comprising the steps of:
   a. said electronic collar determining its latitude and longitude on the Earth;
   b. said electronic module receiving a dynamic boundary file and establishing a control boundary for said animal, said file including geographic boundary information capable of being dynamically altered from one location to another, wherein said step of establishing a control boundary for said animal comprises the steps of loading starting and ending destination points held by said dynamic boundary file and responsive to said boundary file, calculating a plurality of line segments each having end points of A and B, where point A is a starting point and point B is an ending point of each segment, serially connecting said segments such that movement from point A to B through said each segment forms a trek corresponding to said starting and ending destination points, and creating a corridor boundary within each said segment such that a continuous boundary corridor is created from said starting and ending destination points; and
   c. said electronic module continuously monitoring its position with respect to said dynamic boundary and issuing motivating actions to restrict movement of said animal to within the then current boundary limits, wherein said step of issuing motivating actions comprises issuing at least one aural cue and at least one shock to said animal.

10. The method as recited in claim 9, further including the step of creating a moving boundary wall spanning the walls of said boundary corridor, and wherein said boundary wall moves from point A to point B in each segment at a predetermined speed such that movement of said boundary wall causes movement of said animal from point A to point B in each segment in succession, thereby causing said animal to move from said start point to said end point.

11. The method as recited in claim 10, further including the capability of a step of said owner tracing out geo-positional coordinates on a map on an electronic device and causing said coordinates to be saved in a remote database, and wherein said geo-positional coordinates comprise the geographic basis for said dynamic boundary file.

12. The method as recited in claim 11, further including the step of monitoring the geographic position of said animal within each segment and sending said geographic position to said database continually.

13. In conjunction with an electronic collar having an electronics module and including a WiFi chip, a GPS chip, a battery, a speaker, a cellular transceiver, a microprocessor, and a strap, a method of remotely controlling the movements of an animal wearing said electronic collar by an owner comprising the steps of:
   a. said electronic collar determining its latitude and longitude on the Earth;
   b. said electronic module creating a dynamic boundary, wherein said electronic module continually updates said dynamic boundary such that the boundary moves from one location to another, wherein said step of establishing a control boundary for said animal comprises the steps of loading starting and ending destination points held by said dynamic boundary file and responsive to said boundary file, calculating a plurality of line segments each having end points of A and B, where point A is a starting point and point B is an ending point of each segment, serially connecting said segments such that movement from point A to B through said each segment forms a trek corresponding to said starting and ending destination points, and creating a corridor boundary within each said segment such that a continuous boundary corridor is created from said starting and ending destination points; and
   c. said electronic module continuously monitoring its position with respect to said dynamic boundary and issuing motivating actions to said animal such that its movements are restricted to be within the then current boundary limits.

14. The method as recited in claim 13, further including the step of creating a moving boundary wall spanning the walls of said boundary corridor, and wherein said boundary wall moves from point A to point B in each segment at a predetermined speed such that movement of said boundary wall causes movement of said animal from point A to point B in each segment in succession, thereby causing said animal to move from said start point to said end point.

15. The method as recited in claim 14, further including the step of monitoring the geographic position of said animal within each segment and sending said geographic position to said database continually.

16. The method as recited in claim 15, wherein said step of establishing a control boundary further includes the step of updating a remote database with geo-positional information and wherein said step of said electronic module receiving a dynamic boundary file comprises receiving said updated geo-positional information from said remote database.

* * * * *